(12) United States Patent
Nakamura

(10) Patent No.: US 8,172,713 B2
(45) Date of Patent: May 8, 2012

(54) ROTATION OUTPUT DEVICE

(75) Inventor: Daijiro Nakamura, Hyogo (JP)

(73) Assignee: Techtronic Power Tools Technology Limited, Tortola (VG)

( * ) Notice: Subject to any disclaimer, the term of this patent is extended or adjusted under 35 U.S.C. 154(b) by 1048 days.

(21) Appl. No.: 12/063,747

(22) PCT Filed: Aug. 18, 2005

(86) PCT No.: PCT/JP2005/015046
§ 371 (c)(1),
(2), (4) Date: Apr. 17, 2008

(87) PCT Pub. No.: WO2007/020691
PCT Pub. Date: Feb. 22, 2007

(65) Prior Publication Data
US 2009/0260466 A1    Oct. 22, 2009

(51) Int. Cl.
*F16H 35/10* (2006.01)
(52) U.S. Cl. .................. 475/263; 192/223.1
(58) Field of Classification Search ............. 173/29, 173/216; 188/300; 192/71, 89.21, 223.1; 464/37, 41; 475/263–265, 313–315, 317, 475/319–321, 323, 325–327, 331
See application file for complete search history.

(56) References Cited

U.S. PATENT DOCUMENTS

| | | |
|---|---|---|
| 4,804,048 A | 2/1989 | Porth, Jr. |
| 5,624,013 A | 4/1997 | Tsai |
| 6,010,426 A * | 1/2000 | Nakamura ............... 477/22 |
| 6,068,097 A | 5/2000 | Kurita |
| 6,702,090 B2 | 3/2004 | Nakamura et al. |
| 7,063,201 B2 * | 6/2006 | Nakamura et al. ......... 192/223.1 |
| 7,223,198 B2 * | 5/2007 | Kimes et al. ............... 475/331 |
| 2002/0079182 A1 * | 6/2002 | Kettler ................. 192/43.2 |
| 2002/0130006 A1 | 9/2002 | Nakamura et al. |
| 2002/0130007 A1 | 9/2002 | Nakamura et al. |
| 2006/0025224 A1 * | 2/2006 | Saeki et al. ............... 464/37 |
| 2007/0205077 A1 | 9/2007 | Nakamura |
| 2007/0267269 A1 * | 11/2007 | Benoit et al. ............. 192/84.8 |

FOREIGN PATENT DOCUMENTS

| | | |
|---|---|---|
| EP | 0909614 | 4/1999 |
| JP | 01266359 | 10/1989 |
| JP | 03251374 | 11/1991 |
| JP | 06028404 | 2/1994 |
| JP | 06053350 | 2/1994 |

(Continued)

*Primary Examiner* — Justin Holmes
*Assistant Examiner* — Huan Le
(74) *Attorney, Agent, or Firm* — Michael Best & Friedrich LLP

(57) ABSTRACT

A rotation output device including a lock mechanism for automatically locking an output shaft without inertia or a need to pivot the output shaft by the operator after the input shaft stops rotating. The rotation output device includes an output gear for inputting a rotation driving force; a lock ring restricted from rotating; output rings for rotating integrally with the spindle; a click spring for rotating the output rings with respect to the output gear; float gears which are held by the output ring to be urged radially outward and are fixedly engageable with the lock ring; and central pin insertion through-holes and side pin insertion through-holes provided in the output rings for releasing the float gears radially outward and fixedly engaging the float gears with the lock ring. The click spring relatively rotates the output rings by the stoppage of the rotation driving of the output gear.

15 Claims, 10 Drawing Sheets

FOREIGN PATENT DOCUMENTS

| | | |
|---|---|---|
| JP | 11037187 | 2/1999 |
| JP | 11182590 | 7/1999 |
| JP | 2002-337062 | 11/2002 |
| WO | 0178948 | 10/2001 |

* cited by examiner

[FIG. 1]
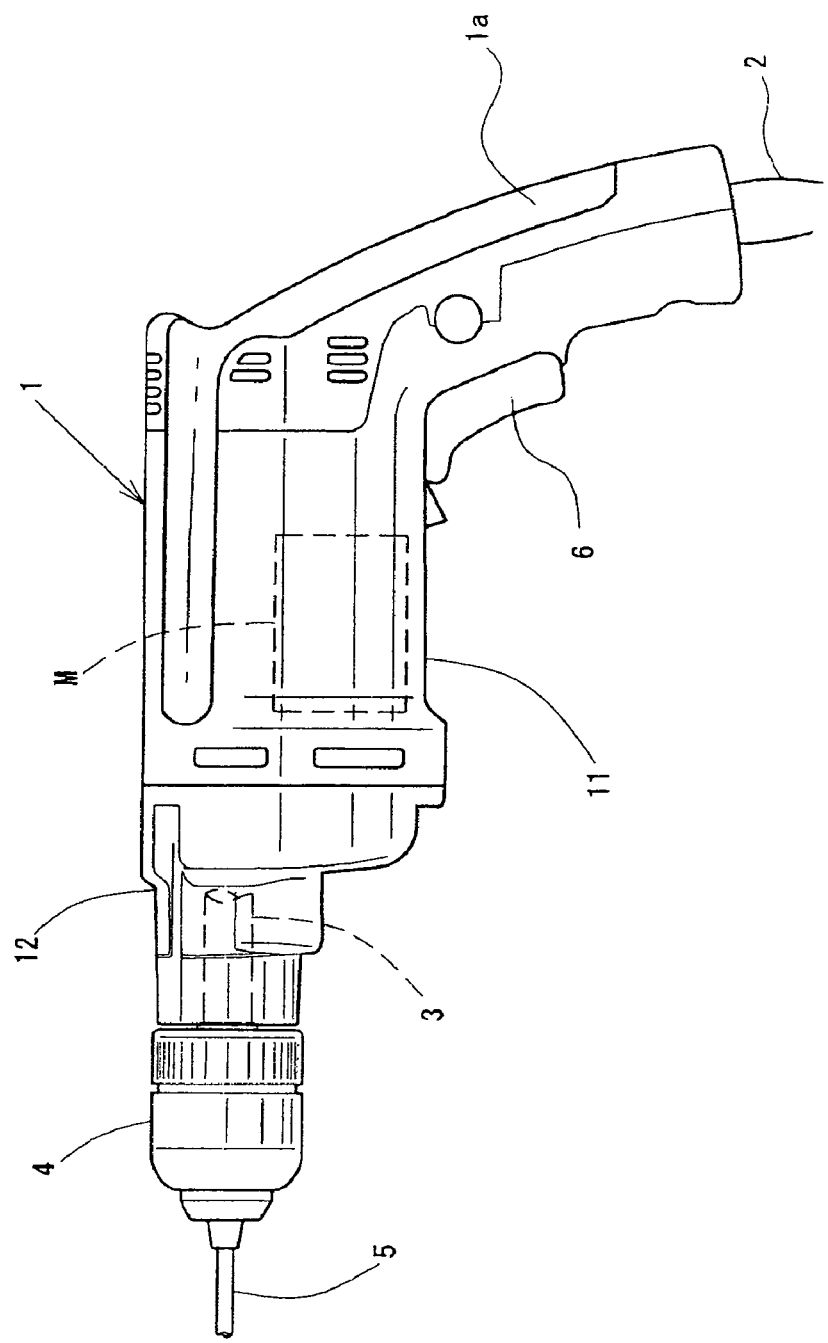

[FIG. 2]
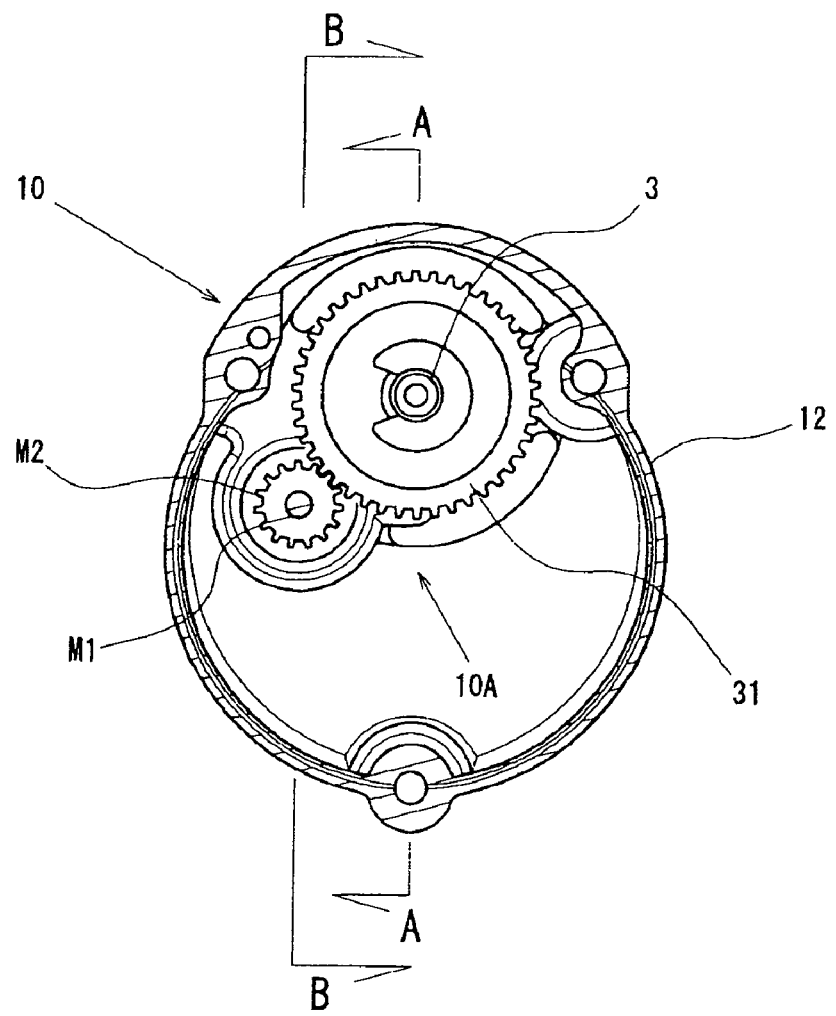

[FIG. 4]
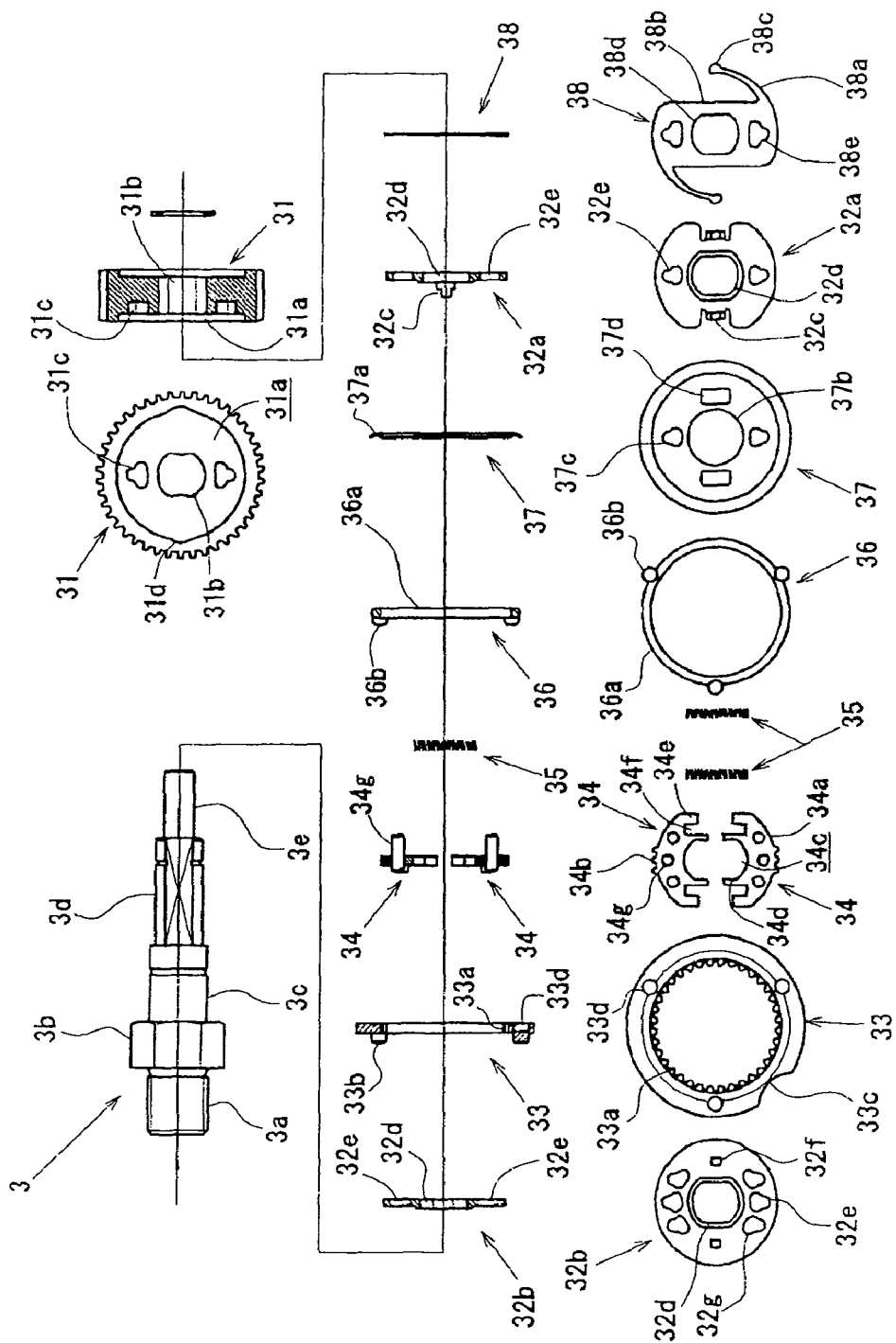

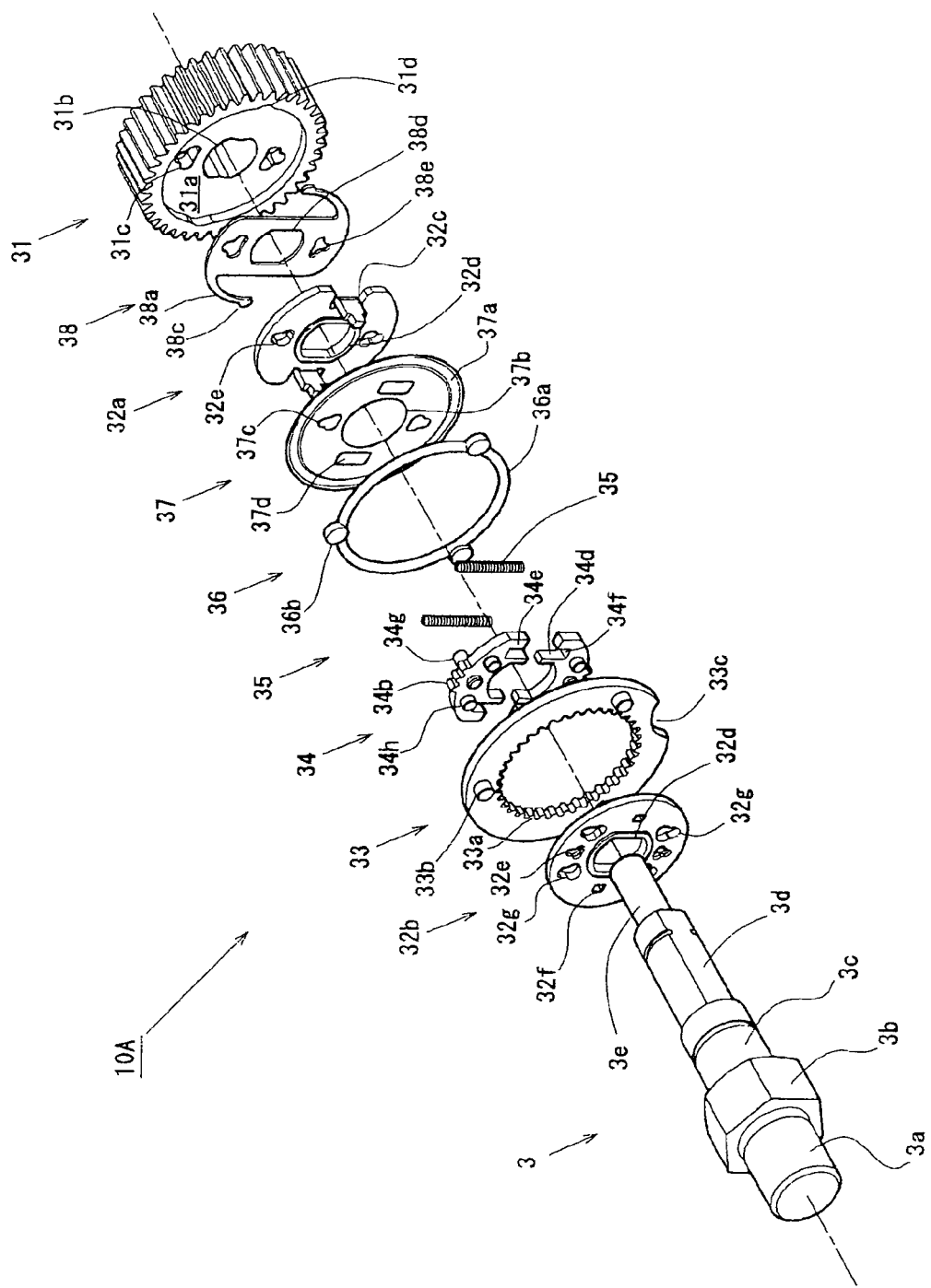
[FIG. 5]

[FIG. 6]
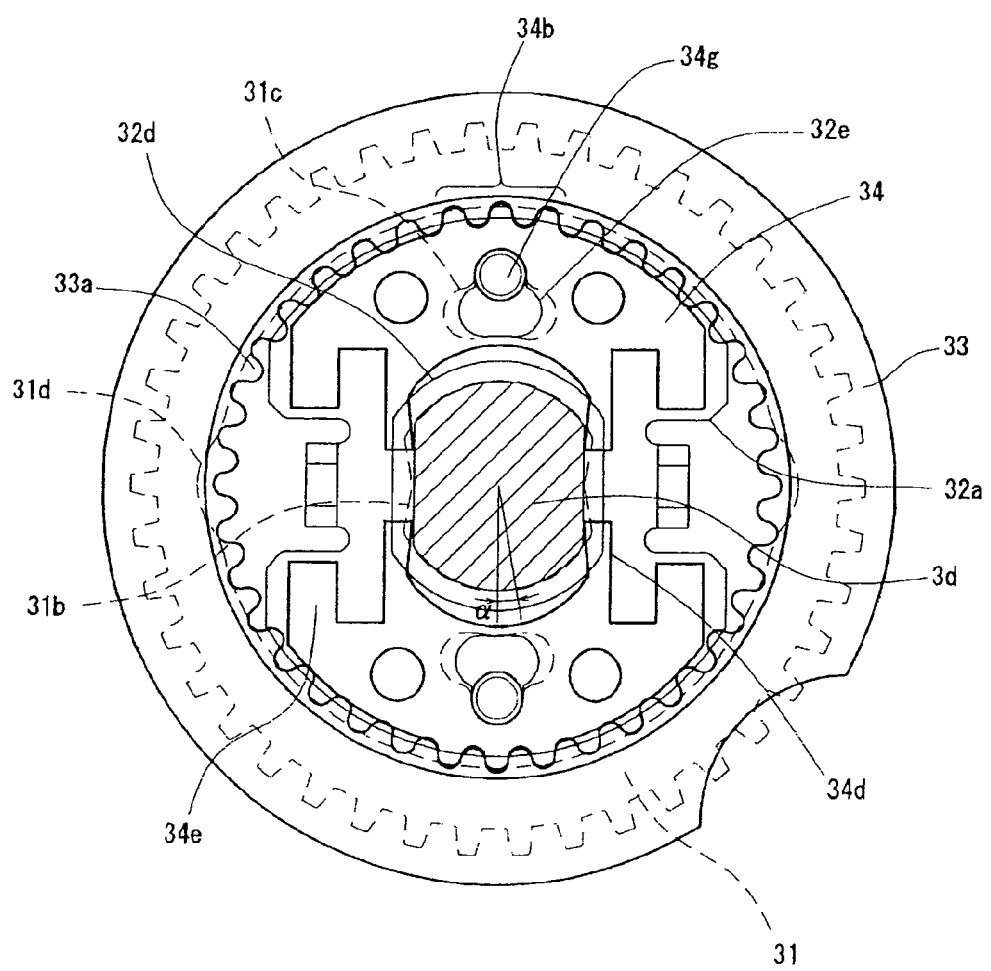

[FIG. 7]
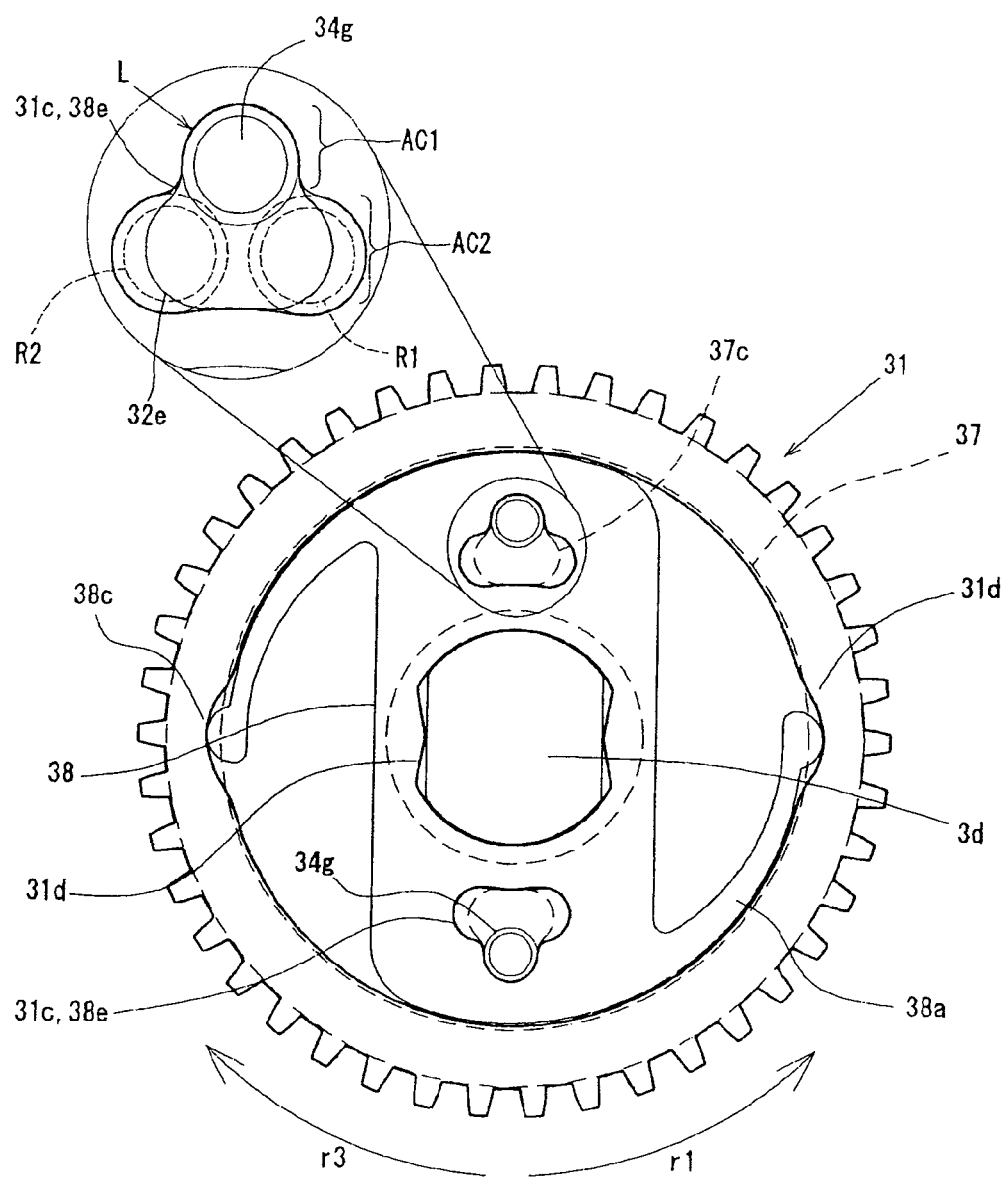

[FIG. 8]
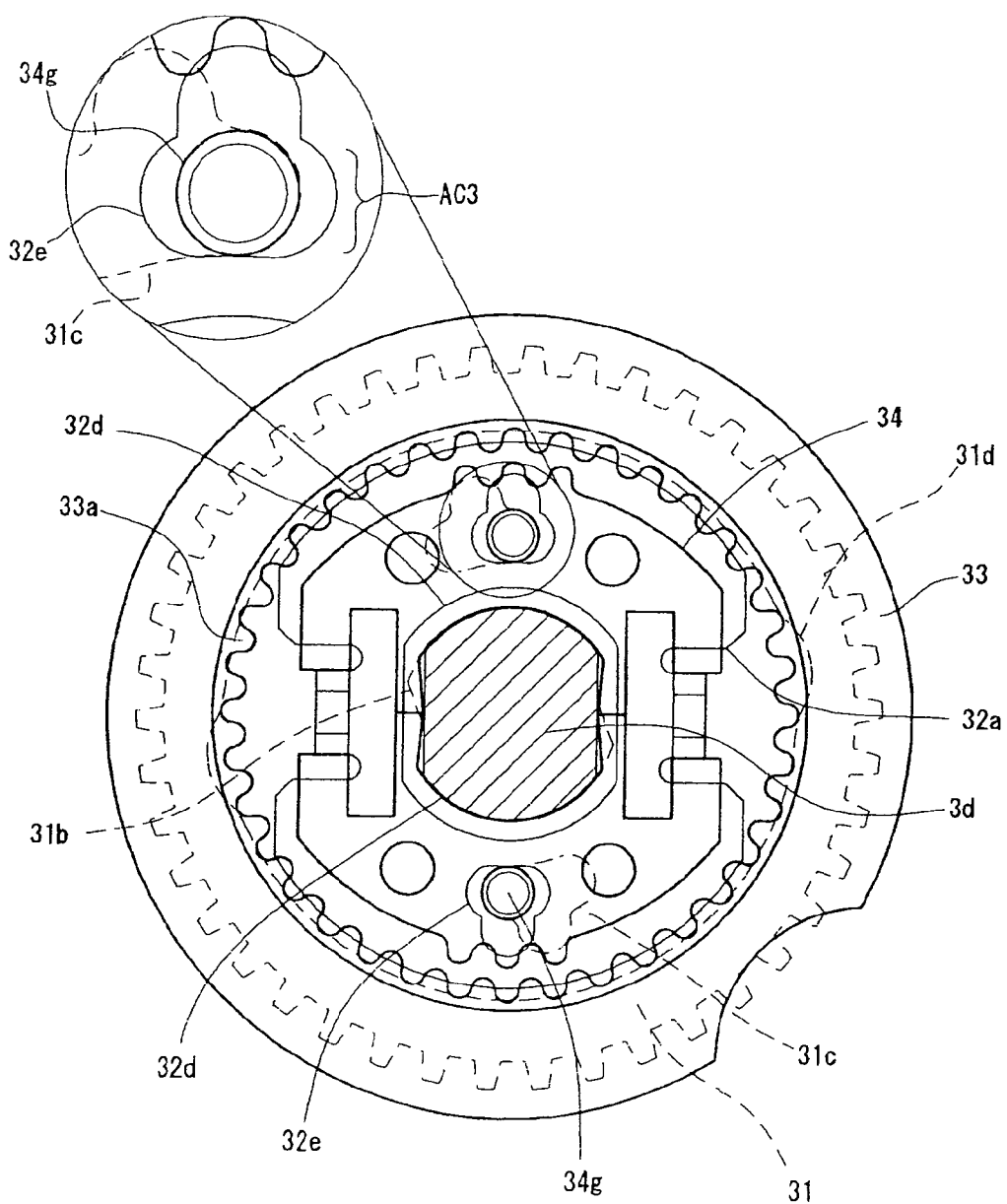

[FIG. 9]
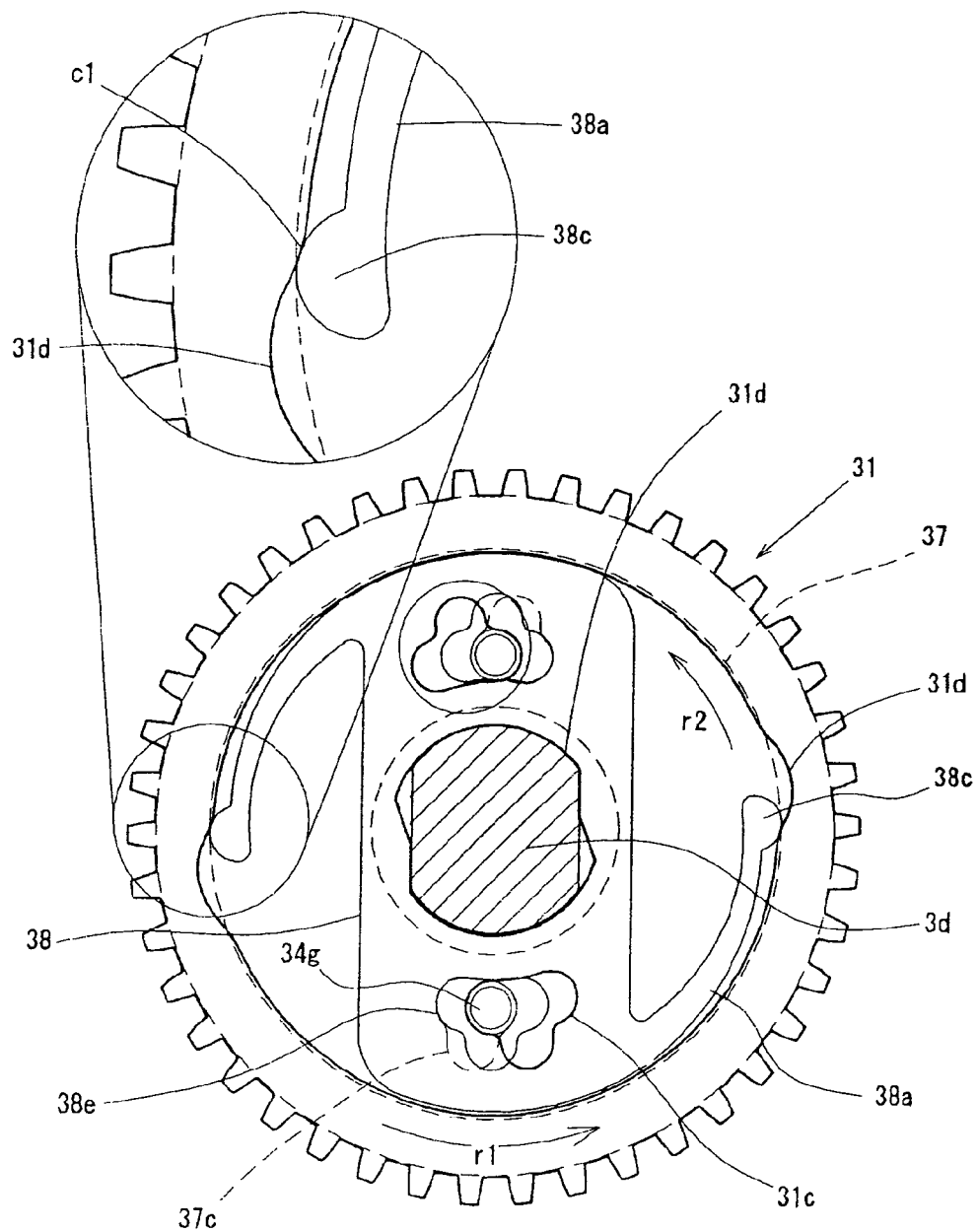

[FIG. 10]
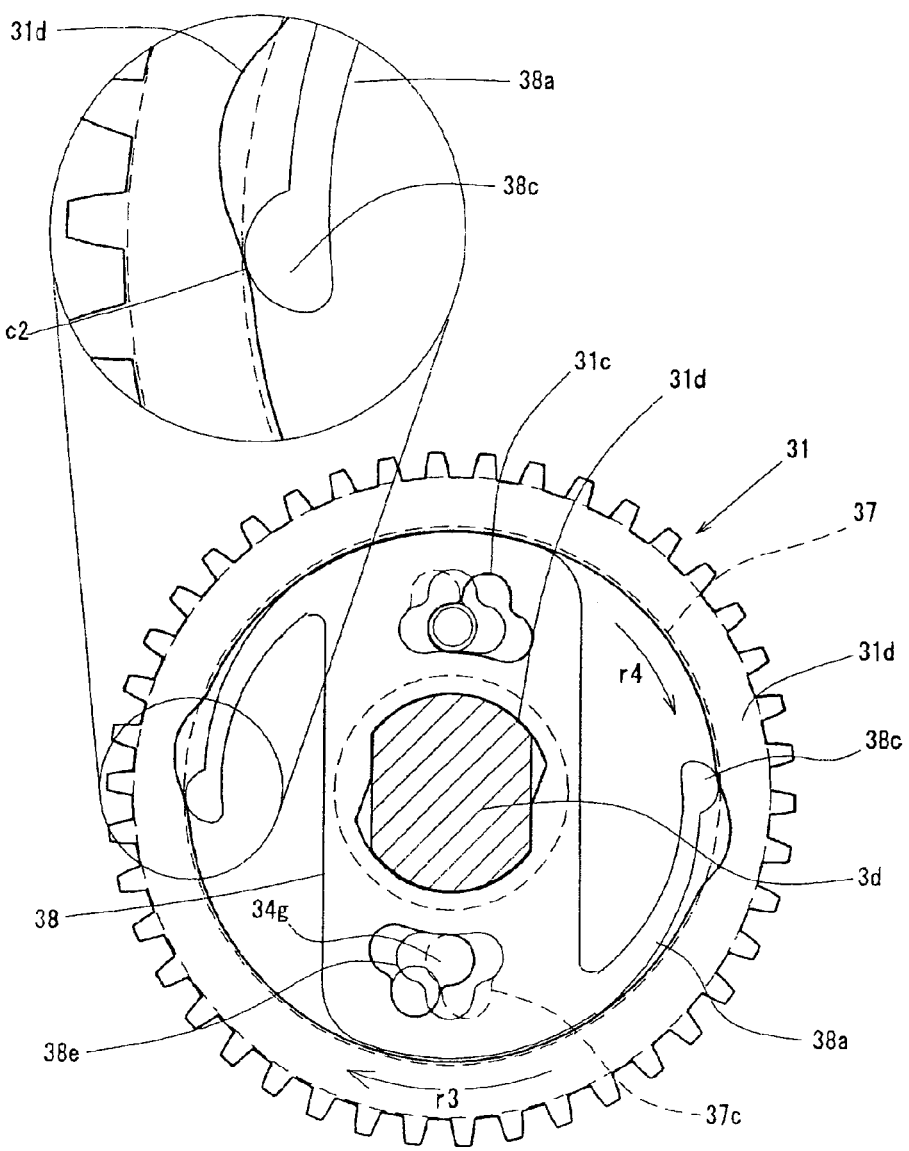

ROTATION OUTPUT DEVICE

FIELD OF THE INVENTION

The present invention relates to a rotation output device usable in, for example, an electric tool such as an electric driver or the like and capable of locking an output shaft of a motor when the motor is controlled to stop and thus the output shaft is stopped.

BACKGROUND ART

Conventionally, electric tools having a function of locking an output shaft (spindle) when the motor is controlled to stop as described above are known (for example, Japanese Laid-Open Patent Publication No. 11-37187, hereinafter "Patent Document 1").

A lock mechanism described in Patent Document 1 has a play angle between an output shaft and an input shaft and includes, on the output shaft side, a locking plate which is urged radially outward (in a locking direction) and a holding plate for restricting the position of the locking plate by a guide groove.

The lock mechanism acts as follows. While the input shaft is being rotated (driven), the holding plate restricts the locking plate at a radially inward position. Therefore, the output shaft is not locked and rotates freely. When the motor stops rotating and thus the input shaft stops rotating, the output shaft is rotated by a play angle because of inertia. Therefore, the locking plate associated with the input shaft moves radially outward through the guide groove of the holding plate. As a result, the output shaft is automatically locked.

As described above, the lock mechanism described in Patent Document 1 instantaneously locks the output shaft using inertia when the motor is stopped. Therefore, the operator does not need to pivot the output shaft by the play angle after the motor is stopped, which significantly improves the operability.

However, the lock mechanism described in Patent Document 1 which uses inertia has the following problem.

When, for example, the motor is stopped after rotating at a low speed, "pivoting because of inertia" is not generated to a sufficient degree. Then, the output shaft is not automatically locked.

In this case, the following occurs. If the operator pivots the output shaft in the same direction as the direction in which the output shaft has been rotated, this means that the output shaft is pivoted in the same direction as the "pivoting because of inertia." Therefore, the output shaft is locked. By contrast, if the operator pivots the output shaft on the opposite direction, the input shaft is also pivoted in the same direction as the output shaft. Therefore, the relative positions of the locking plate and the input shaft are not changed. As a result, the output shaft is not locked.

When the output shaft is not locked as described above, the lock mechanism does not provide its function. In addition, since the output shaft is not locked, the operator needs to pivot the output shaft in the state of receiving a load of the stoppage of the motor for an extended period of time. This deteriorates the operability.

In order to solve this problem, Patent Document 1 adds a lock operating mechanism using a planet gear set with such a structure, in whichever direction the operator may pivot the output shaft, the relative positions of the locking plate and the input shaft are necessarily changed so as to guarantee that the output shaft is locked.

However, in the case where such a lock operating mechanism is added, a complicated mechanism of the planet gear set is additionally required, which may lower the reliability, durability or the like of the lock mechanism itself. A space for the lock operating mechanism is also required, and the lock mechanism cannot be formed to be compact.

SUMMARY OF THE INVENTION

The present invention has an object of providing a rotation output device including a lock mechanism for automatically locking an output shaft without inertia and with no need of pivoting the output shaft by the operator after the input shaft stops rotating.

In one embodiment, a rotation output device according to the present invention comprises a rotation input body configured to input a rotation driving force; a rotation output body located coaxially with the rotation input body and configured to receive a driving force from the rotation input body with a predetermined play angle and to output a rotation force; a fixing member provided around an outer circumferential surface of the rotation output body and restricted from rotating; a guide holding plate fixed to the rotation output body and configured to rotate integrally with the rotation output body; a relative rotation means fixed to the rotation output body and configured to rotate the guide holding plate with respect to the rotation input body; a movement locking plate that is held by the guide holding plate, wherein the movement locking plate is configured to be urged radially outward and to fixedly engage the fixing member; a lock operation groove provided in the guide holding plate and configured to release the movement locking plate radially outward and fixedly engage the movement locking plate with the fixing member; and a release operation groove provided in the rotation input body and configured to guide the movement locking plate radially inward and to release the movement locking plate from the fixed engagement with the fixing member by the rotation of the rotation input body. The relative rotation means is configured to relatively rotate the guide holding plate upon stoppage of the rotation driving of the rotation input body.

The stoppage of the rotation driving occurs when, and after, the rotation driving is stopped. According to the above-described structure, the relative rotation means rotates the guide holding plate with respect to the rotation input body by the stoppage of the rotation driving of the rotation input body. Therefore, the lock operation groove provided in the guide holding plate releases the movement locking plate radially outward and fixedly engages the guide holding plate with the fixing member. Thus, the lock mechanism can be automatically placed into a lock state.

By the rotation of the rotation input body, the release operation groove provided in the rotation input body guides the movement locking plate radially inward and releases the movement locking plate from the fixed engagement with the fixing member. Thus, the lock mechanism can be automatically released from the lock state.

In one embodiment of the present invention, the relative rotation means is configured to rotate the guide holding plate with respect to the rotation input body in a direction in which the rotation input body was last rotated after the rotation input body stops rotating.

The above-described structure reduces the change in relative positions of the lock operation groove and the release operation groove needed to release the lock mechanism from the lock state. As a result, the movement locking plate can be released radially outward and fixedly engaged with the fixing member with certainty, and thus the lock mechanism can be placed into a lock state.

In one embodiment of the present invention, the relative rotation means rotates the guide holding plate with respect to the rotation input body by an angle corresponding to the play angle.

The above-described structure eliminates the need to change the relative positions of the lock operation groove and the release operation groove to release the lock mechanism from the lock state. As a result, the movement locking plate can be released radially outward and fixedly engaged with the fixing member with further certainty, and thus the lock mechanism can be placed into a lock state. Since the movement locking plate can be engaged with the fixing member without loosely engaging the movement locking plate with the lock operation groove or the release operation groove, a lock mechanism with no play can be provided.

In one embodiment of the present invention, the relative rotation means comprises a plurality of click springs. According to the above-described structure, as compared to a structure having one click spring, the force for rotating the guide holding plate with respect to the rotation input body can be increased. Thus, the guide holding plate can be rotated with respect to the rotation input body with certainty.

In one embodiment of the present invention, the rotation input body includes an arc-shaped groove and each click spring comprises an arc-shaped claw having substantially the same shape as that of the arc-shaped groove and being configured to engage the arc-shaped groove. According to the above-described structure, the rotation of the guide holding plate with respect to the rotation input body can be smoothly caused by the arc-shape of the arc-shaped groove and the arc-shaped claw. Thus, the guide holding plate can be rotated with respect to the rotation input body with further certainty.

In one embodiment of the present invention, the arc-shaped claw of each click spring is engaged with the arc-shaped groove with an elastic force. According to the above-described structure, as compared to, for example, a structure in which the arc-shaped claw is engaged with the arc-shaped groove by a driving force from a separate driving source, the number of parts and components can be reduced and the assembly thereof is easier. In the case where the arc-shaped claw is engageable with the arc-shaped groove by an elastic force, the structure is relatively simple. Therefore, the possibility of the reliability, durability or the like of the lock mechanism itself being deteriorated can be lowered.

In one embodiment of the present invention, an escaping portion is provided between the movement locking plate and the rotation output body. According to the above-described structure, an escaping portion is formed. Therefore, the rotation of the rotation output body is not transmitted.

Accordingly, the movement locking plate can be certainly prevented from rotating by an angle corresponding to the "escaping portion" together with the rotation output body. Thus, the movement locking plate can be certainly prevented from rotating together with the rotation output body. Accordingly, even when the rotation input body and the rotation output body are rotated together with no play angle, the movement locking plate is not rotated. As a result, the lock function can be provided with certainty.

In one embodiment of the present invention, the guide holding plate has a plurality of lock operation grooves; and the movement locking plate has a plurality of engagement projections configured to be engaged with the lock operation grooves. According to the above-described structure, the locking operation is performed by engaging a plurality of engagement projections of the movement locking plate with a plurality of lock operation grooves of the guide holding plate.

Therefore, the guide holding plate and the movement locking plate are engaged with each other at a plurality of positions, which improves the rigidity at the plurality of positions and thus improves the lock torque in the lock state. As a result, the lock torque by the movement locking plate in the lock state is improved, which provides a more certain and stable lock function.

In one embodiment of the present invention, the guide holding plate comprises a fixing part that is thicker than the remaining part of the guide holding plate, and the fixing part is configured to fix the guide holding plate to the rotation output body. According to the above-described structure, the thickness of a fixing part of the guide holding plate for fixing the guide holding plate and the rotation output body to each other is made greater than the thickness of the remaining parts. Therefore, the area which receives the pressure from the rotation output body can be enlarged.

Accordingly, the guide holding plate can receive the rotation torque from the rotation output body with certainty while the guide holding plate is made thinner. Thus, the guide holding plate can receive the rotation torque from the rotation output body with certainty and thus the lock torque can be improved, while the guide holding plate is formed to be compact.

In one embodiment of the present invention, the rotation output device further comprises a restriction plate configured to restrict a positional change of the movement locking plate. The restriction plate is provided between the movement locking plate and the fixing member, and is further configured to integrally rotate with the movement locking plate such that an outer end of the restriction plate contacts the fixing member. According to the above-described structure, the restriction plate does not slide along the movement locking plate while being in contact therewith. This prevents the restriction plate from adversely influencing the locking or releasing operation of the movement locking plate.

Thus, even though the restriction plate is provided, the locking function of the movement locking plate can be stably provided with no undesirable possibility of being inhibited. The positional change of the movement locking plate is restricted by the restriction plate. Therefore, the movement locking plate, which is in the release state, is prevented from being placed into the lock state by an external force other than the rotation input body.

In one embodiment of the present invention, the rotation output device further comprises a sliding resistance increasing means for increasing a sliding resistance, the sliding resistance increasing means being provided at a position where the restriction plate contacts the fixing member. The sliding resistance increasing means encompasses means formed of an elastic material. According to the above-described structure, the restriction plate contacts the fixing member with a higher sliding resistance. This makes the restriction plate more easily influenced by the restriction on the rotation by the fixing member. As a result, the position of the restriction plate in the rotation direction is maintained with certainty, and the position of the movement locking plate in the rotation direction is maintained certainly by the restriction plate.

In the case where the sliding resistance increasing means is formed of an elastic material, the restriction plate and the fixing member are allowed to contact each other constantly. Namely, since the relative positional offset between the restriction plate and the fixing member is absorbed by the elastic material, the restriction plate and the fixing member can be in contact with each other constantly. Therefore, the position of the movement locking plate in the rotation direction is maintained constantly and certainly by the restriction plate.

In one embodiment of the present invention, the rotation output device includes a plurality of movement locking plates in a circumferential direction, wherein the plurality of movement locking plates are configured to be integrally rotated by the restriction plate.

According to the above-described structure, the lock torque can be increased by providing a plurality of movement locking plates. Since the plurality of movement locking plates are integrally rotated by one restriction plate, the plurality of movement locking plates are provided with a completely equal force of maintaining the position thereof in the rotation direction. Accordingly, the positions of the movement locking plates in the rotation direction are not separately maintained. Even in the case where a plurality of movement locking plates are provided, the positions thereof in the rotation direction can be constantly maintained in synchronization with each other.

A rotation output device according to the present invention is usable in an output system of an electric tool and also an appliance requiring a rotation output. Thus, the operations of the electric tool or the like in a lock state can be performed very easily.

According to the present invention, in a rotation output device including a lock mechanism for automatically locking an output shaft when the input shaft stops rotating, the output shaft is certainly locked without a complicated structure of a planet gear set or the like, or inertia.

BRIEF DESCRIPTION OF DRAWINGS

FIG. 1 is a side view of an electric tool adopting a rotation output device.

FIG. 2 is a rear view of the rotation output device attached to a gear case.

FIG. 4 shows elements of a lock mechanism in the rotation output device in an exploded state in a front view and a rear view.

FIG. 5 is an exploded perspective view showing the elements of the lock mechanism in the rotation output device.

FIG. 6 is a front view of a lock ring, float gears, a motor-side output ring, and an output gear in a lock state.

FIG. 7 is a front view of the output gear, a click spring, and a delay plate in the lock state.

FIG. 8 is a front view of the lock ring, the float gears, the motor-side output ring, and the output gear in a release state where the output gear is rotated in the direction of arrow r1 by the driving force of the motor.

FIG. 9 is a front view of the output gear, the click spring, and the delay plate in the release state where the output gear is rotated in the direction of arrow r1 by the driving force of the motor.

FIG. 10 is a front view of the output gear, the click spring, and the delay plate in the release state where the output gear is rotated in the direction of arrow r3 by the driving force of the motor.

DESCRIPTION OF REFERENCE NUMERALS

Figures 3A, 3B:
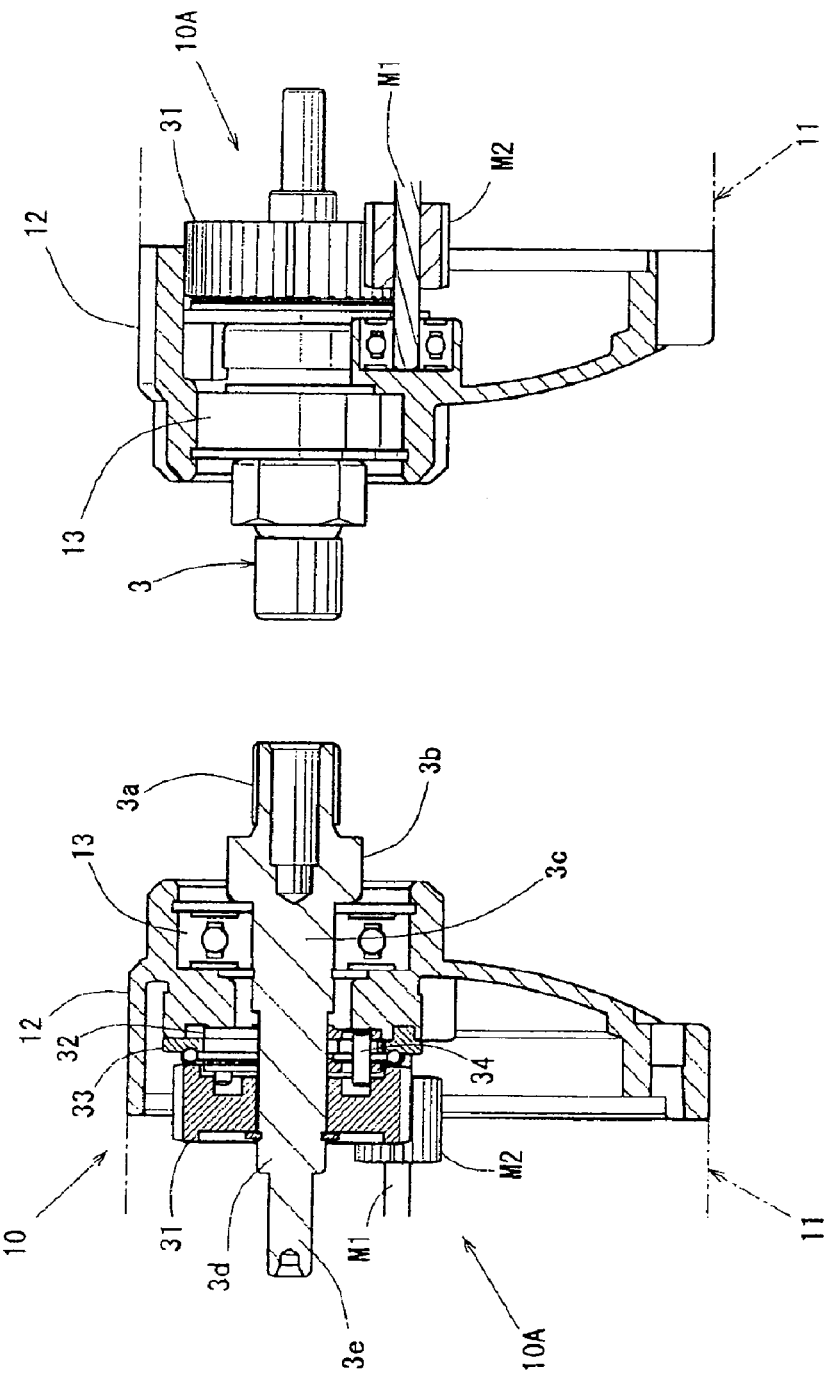
FIG. 3 shows cross-sectional views illustrating the gear case in the state where the rotation output device is attached thereto.

3 Spindle
10 Rotation output device
10A Lock mechanism
31 Output gear
31c Pin insertion hole
31d Engagement groove
32 Output ring
32d Shaft insertion hole
32e Central pin insertion through-hole
32g Side pin insertion through-hole
33 Lock ring
33d Insertion recess
34 Float gear
34c Loose engagement portion
34g Stoppage pin
34h Stoppage projection
36 Legged O-ring
37 Delay plate
38 Click spring
38c Hook

DETAILED DESCRIPTION

One embodiment of the present invention will be described in detail with reference to the drawings. FIG. 1 shows an electric tool adopting a rotation output device according to the present invention. As shown in FIG. 1, the electric tool includes a housing 1 having a handle 1a to be held by the operator when the operator uses the electric tool, an electric cord 2 provided below the handle la, a spindle 3 provided forward to the housing 1, a chuck 4 attached to the spindle 3, and a drill bit 5 supported by the chuck 4.

The housing 1 includes a main body case II and a gear case 12 attached to a front part of the main body case 11. The housing 1 accommodates therein a motor M selectably rotatable in a forward direction or a reverse direction and a rotation output device 10 (see FIG. 2) described later. A rotation driving force of the motor M is transmitted to the spindle 3 via the rotation output device 10. A switch handle 6 for inputting a driving signal to the motor M is provided in an upper front part of the handle 1 of the housing 1.

This embodiment is described with a general type electric tool having an electric cord. The power source of the electric tool is not specifically limited, and the present invention is also applicable to a portable type electric tool using a battery. The present invention is not limited to being used in an electric tool and is also applicable to an appliance used in a driver, grinder, router or the like. The present invention is not limited to being used in an appliance driven by electricity, and is applicable to an appliance driven by compressed air, a hydraulic appliance or the like.

Next, with reference to FIG. 2 and FIG. 3, the rotation output device 10 provided in the electric tool will be described. The rotation output device 10 includes a lock mechanism 10A in the gear case 12. The lock mechanism 10A transmits the rotation output from an output shaft M1 of the motor M, and locks or releases the spindle 3.

The lock mechanism 10A mainly includes the following elements: an output gear 31 for receiving a rotation driving force from the output shaft M1 of the motor M, a lock ring 33 located at an outer edge of the lock mechanism 10A for fixing the lock mechanism 10A to the gear case 12, two float gears 34 engageable with inner teeth of the lock ring 33, two output rings 32 (32a, 32b) fixedly engageable with the spindle 3 for holding the float gears 34 from the front and the rear in the axial direction of the lock mechanism 10A, and a click spring 38 fixedly engageable with the spindle 3 and stopped by the output gear 31 with these elements, the lock mechanism 1 OA automatically locks the spindle 3 at the same time when, or after, the motor M is stopped, and automatically releases the spindle 3 when the motor M starts rotating.

As shown in FIG. 2, the output shaft M1 is located at the direction of 7 o'clock with respect to the spindle 3 when seen from the back (in FIG. 2 bottom left). Outer circumferential teeth of an input gear M2 for transmitting the rotation driving force of the output shaft M1 to the output gear 31, and outer circumferential teeth of an outer gear of the output gear 311 may be of a helical gear type or a spar gear type.

With reference to FIG. 4 and FIG. 5, a detailed structure of the lock mechanism 10A will be described. FIG. 4 shows the elements of the lock mechanism 10A in the rotation output device 10 in an exploded state. In FIG. 4, the elements are shown both in a front view and a rear view. FIG. 5 is an exploded perspective view showing the elements of the lock mechanism 10A in the rotation output device 10.

As shown in FIG. 4, the lock mechanism 10A includes the chuck-side output ring 32b the lock ring 33, the two float gears 34, two coil springs 35, a legged O-ring 36, a delay plate 37, the motor-side output rings 32a, the click spring 38, and the output gear 31. These elements are arranged in this order from the side of the chuck 4. These elements, except for the two float gears 34 and the coil spring 35, are assembled as a ring and coaxially provided.

The spindle 3 includes a chuck shaft insertion section 3a, a hexagonal section 3b, a shaft fixing section 3c, an oblong connection section 3d, and a shaft fixing section 3e which are arranged in this order from the side of the chuck 4 shown in FIG. 1. The hexagonal section 3b has a hexagonal shape, when seen from the front, generally inscribed to a circle having a diameter which is about 1.5 times the diameter of the chuck shaft insertion section 3a. The shaft fixing section 3c has a cross section having substantially the same diameter as that of the cross section of the chuck shaft insertion section 3a, and is axially supported by a bearing 13 (FIG. 3) which is provided in a front part of the inside of the gear case 12. The oblong connection section 3d has an oblong cross section having a diameter shorter by a certain degree than that of the cross section of the chuck shaft insertion section 3a. Herein, "oblong" refers to a shape obtained by changing two separate portions of a circle interposing the center of the circle into two parallel straight lines each having a shorter length than the diameter of the circle. The shaft fixing section 3e has a cross section having a diameter which is about a half of the diameter of the chuck shaft insertion section 3a and is axially supported by a bearing (not shown) provided at about the center of the inside of the gear case 12.

The output gear 31 is a spar gear having a diameter which is about three times the diameter of the oblong connection section 3d and an appropriate thickness. The output gear 31 has a circular recessed portion 31a in a front surface thereof. The circular recessed portion 31a has a diameter which is about ⅘ of the diameter of the output gear 31 and a depth which is about ⅐ of the thickness of the output gear 31. The output gear 31 has a shaft insertion hole 31b at the center of the output gear 31 when seen from the front. The shaft insertion hole 31b is loosely engageable with the oblong connection section 3d. The output gear 31 also has pin insertion holes 31c opposed to each other with the shaft insertion hole 31b interposed therebetween. Into the pin insertions 31c, stoppage pins provided at the center of the float gears 34 as described later are to be inserted. The output gear 31 may be a helical gear.

The shaft insertion hole 31b has a generally oblong shape when seen from the front, in which a top part and a bottom part are arc-shaped and projecting outward. The oblong connection section 3d is loosely engageable with the shaft insertion hole 31b with a play angle α (see FIG. 6). The pin insertion holes 31c each have a generally isosceles triangular shape formed of three continuous circles each having a diameter slightly longer than that of the stoppage pin of the float gears 34, when seen from the front. The three circles are located at positions of three angles (in this embodiment, located at positions of 0 degrees, 102 degrees and 258 degrees). The pin insertion holes 31c each have a depth which is about ¼ of the thickness of the output gear 31. The pin insertion holes 31c are projected radially outward.

The arcs forming the bottom side of each isosceles triangle are located at a pitch corresponding to the differential provided by the play angle α of the stoppage pin. The pin insertion holes 31c may be through-holes in the output gear 31.

In a circumferential surface of the circular recessed portion 31a, arc-shaped engagement grooves 31d engageable with hooks at the tip of the click spring 38 as described later are formed. The engagement grooves 31d are opposed to each other with the center of the circular recessed portion 31a interposed therebetween, namely, on both sides of the shaft insertion hole 31b. The phantom straight line connecting the engagement grooves 31d perpendicularly crosses the phantom straight line connecting the pin insertion holes 31c. The length of each engagement groove 31d corresponds to the play angle α at which the oblong connection section 3d and the circular recessed portion 31a are loosely engaged with each other.

In more detail, the engagement grooves 31d are to rotate with respect to the hooks at the tip of the click spring 38 so as to press spring arms described below. In order to realize such a relative rotation, the diameter of the arc of each engagement groove 31d is changed in the direction in which the engagement grooves 31d rotate with respect to the hooks.

The click spring 38 is generally Z-shaped when seen from the front, and includes two arc-shaped, elastic spring arms 38a opposed to each other with the center of the click spring 38 interposed therebetween. The click spring 38 also includes a longitudinal oblong central plate 38b. The spring arms 38a and the central plate 38b are integrally formed. The central plate 38b has two arc portions opposed to each other with the center thereof interposed therebetween. Each arc portion of the central plate 38b and the spring arm 38a connected thereto form a substantial quarter circumference of a circle having a diameter which is slightly shorter than the diameter of the circular recessed portion 31a.

Each spring arm 38a has a hook 38c at the tip thereof. The hook 38c protrudes radially outward and is engageable with the respective engagement groove 31d. The central plate 38b has a shaft insertion hole 38d having substantially the same shape as that of the cross section of the oblong connection section 3d, at the center of the central axis running in the longitudinal direction of the central plate 38b. The central plate 38b also has pin insertion through-holes 38e having the same shape as that of the pin insertion holes 31c when seen from the front. The pin insertion through-holes 38e are located in positional correspondence with the pin insertion holes 31c, on the central axis of the shaft insertion section 38d and outside of the shaft insertion section 38d.

The motor-side output ring 32a has a generally oblong shape, and has substantially the same diameter as that of the circular recessed portion 31a and an appropriate thickness. The motor-side output ring 32a has engagement claws 32c at about the center of side straight portions. The engagement claws 32c are formed by bending portions near the side straight portions toward the chuck 4. The motor-side output ring 32a also has a shaft insertion hole 32d, at the center thereof, having substantially the same shape as that of the cross section of the oblong connection section 3d, and central pin insertion through-holes 32e in positional correspondence with the pin insertion holes 31c. The engagement claws 32c are engageable with engagement holes 32f of the chuck-side output ring 32b.

Each central pin insertion through-hole 32e is formed of three continuous circles each having a diameter slightly longer than that of the stoppage pin of the float gears 34. The three circles are located at positions of three angles (in this embodiment, located at positions of 0 degrees, 134 degrees and 226 degrees). Both of two ends of a half circle of the upper circle are respectively connected to each of the two bottom circles by a radial straight line having a length of ¼ of the radius of each of the three continuous circles. Among the three arcs of the three circles, the arcs of the two bottom circles are located at a pitch corresponding to the differential provided by ½ of the play angle $\alpha$ of the stoppage pin.

A part around the shaft insertion hole 32d having an appropriate width is projected toward the chuck 4, namely, is formed to be thicker than the remaining part of the output ring 32a. In more detail, the part around the shaft insertion hole 32d has a thickness which is about 1.3 times the thickness of the remaining part.

The delay plate 37 is formed of a thin plate which is smaller by a certain degree than the phantom circle made of the teeth of the output gear 31. The delay plate 37 has a stoppage groove 37a around the outer perimeter thereof. The stoppage groove 37a is circular when seen from the front and has an arc-shaped cross section protruding toward the motor M. The legged O-ring 36 slides in engagement with the stoppage groove 37a. The delay plate 37 has a through-hole 37b at the center thereof, which is circular when seen from the front and has a diameter larger by a certain degree than that of the oblong connection section 3d.

The delay plate 37 has two pin insertion through-holes 37c having the same shape as that of the central pin insertion through-holes 32e. The pin insertion through-holes 37c have a generally isosceles triangular shape protruding radially outward, and are opposed to each other with the through-hole 37b interposed therebetween. The delay plate 37 also has two rectangular through-holes 37d for allowing the engagement claws 32c to pass therethrough. The rectangular through-holes 37d are opposed to each other with the through-hole 37b interposed therebetween. The phantom straight line connecting the rectangular through-holes 37d perpendicular crosses the phantom straight line connecting the pin insertion through-holes 37c, and the rectangular through-holes 37d are longer in the direction of the phantom straight line connecting the pin insertion through-holes 37c.

The legged o-ring 36 includes a circular ring portion 36a having a circular cross section and being slidable in engagement with the stoppage groove 37a. The legged O-ring 36 also includes cylindrical legs 36b having a height which is substantially the same as the diameter of the cross section of the circular ring portion 36a and an appropriate diameter.

The legs 36b are provided at positions of three angles (0 degrees, 120 degrees, and 240 degrees) which divide the circular ring portion 36a substantially equally. A radially inward part of the circumference of each leg 36b coincides with the inner circumference of the circular ring portion 36a. A front circular surface of each leg 36b projects toward the chuck 4 from the circular ring portion 36a. The appropriate diameter of the legs 36b is determined such that, when the legged O-ring 36 is attached to the lock ring 33, the radially outer end of each leg 36b is inner to the outer circumference of the lock ring 33 and such that the legs 36b can be inserted into insertion recesses 33d described later. The circular ring portion 36a and the legs 36b are integrally formed of an elastic rubber or resin material.

The float gears 34 are each generally comb-shaped with four legs and an arc-shaped portion 34a projecting upward. The arc-shaped portion 34a has a diameter which is slightly smaller than the diameter of the phantom circle made of the inner teeth of the lock ring 33 described later. The arc portion 34a has three teeth 34b, at the center of the top edge thereof, which are engageable with the inner teeth of the lock ring 33. The three teeth 34b are located to be right and left symmetrical with respect to the central line of the float gear 34.

Each float gear 34 has a loose engagement portion 34c, at the center of the bottom portion thereof. The oblong connection section 3d is loosely engageable with the loose engagement portion 34c with the play angle $\alpha$. Each float gear 34 also has right and left symmetrical center legs 34d forming a leg portion of the loose engagement portion 34c. The distance between each leg 34d and the respective outer end of the float gear 34 is about ¼ of the entire width of the float gear 34.

Each float gear 34 has right and left symmetrical outer legs 34e, at two ends thereof in the width direction and therefore outside the center legs 34d, with an appropriate distance from the center legs 34d. The bottom surface of each outer leg 34d is at about the same level as the ends of the arc of the loose engagement portion 34c, and each center leg 34d has a length which is about twice the length of the outer leg 34e and a width which is about a half of the width of the outer leg 34e.

The appropriate distance between the outer leg 34e and the center leg 34d is longer by a certain degree than the diameter of the coil spring 35 in the width direction described later. A spring attachment portion 34f loosely engageable with the coil spring 35 is formed between each outer leg 34e and the corresponding center leg 34d.

Each float gear 34 has a stoppage pin 34g on the central axis thereof in the width direction, at about the center between the top edge of the arc portion 34a and the top edge of the loose engagement portion 34c. The stoppage pin 34g fixedly runs through the float gear 34 and has an appropriate diameter and an appropriate length. The length of a part of the stoppage pin 34g which protrudes from the rear surface of the float gear 34 toward the motor M is fixed to be about four times the length of a part of the stoppage pin 34g which protrudes from the front surface of the float gear 34 toward the chuck 4.

The float gear 34 also has right and left symmetrical stoppage projections 34h at about the center between the top edge of the arc portion 34a and the top edge of the loose engagement 34c, at an appropriate distance from the stoppage pin 34g. The stoppage projections 34h are circular when seen from the front, have substantially the same diameter as that of the stoppage pin 34g, and are projected toward the chuck 4 by press working. The length of a part of each stoppage projection 34h which protrudes from the front surface of the float gear 34 toward the chuck 4 is fixed to be about 1.5 times the length of the part of the stoppage pin 34g which protrudes from the front surface of the float gear 34 toward the chuck 4. The stoppage projections 34h are only needed to operate and function in the same manner as the stoppage pin 34g. The stoppage projections 34h may be fixed to the front gear 34 instead of being formed by press working as in this embodiment.

The lock mechanism 10A has two upper and lower symmetrical floating gears 34, and one coil spring 35 is provided to be loosely engaged with the spring attachment portion 34f of the upper and lower symmetrical floating gears 34 on the right side, and another coil spring 35 is provided to be loosely engaged with the spring attachment portion 34f of the upper and lower symmetrical floating gears 34 on the left side.

The lock ring 33 is ring-shaped with an outer circumference which is larger by a certain degree than the phantom circle made of the teeth of the output gear 31 and with an inner circumference which is slightly smaller than the circular recessed portion 31a. The lock ring 33 has inner teeth 33a engageable with the float gears 34, on an inner circumferential surface thereof. The lock ring 33 has fixing projections 33b which are circular when seen from the front, at positions of three angles (90 degrees, 210 degrees, and 330 degrees) which divide the lock ring 33 substantially equally. The fixing projections 33b each have a predetermined diameter and are projected toward the chuck 4 by press working. The lock ring 33 has an arc-shaped cutout 33c projecting radially inward, at a bottom left position of the outer circumference thereof. The cutout 33c is provided for preventing interference between the output shaft M1 of the motor M and the lock ring 33.

The fixing projections 33b are provided for fixedly engaging the lock ring 33 with the gear case 12. Recessed portions on the rear surface of the lock ring 33 which are formed by the press working for forming the fixing projections 33b each form the insertion recesses 33d, into which the leg 36b is to be inserted.

The chuck-side output ring 32b has a circular shape, when seen from the front, having the same diameter as that of the arc-shaped portions of the motor-side output ring 32a and has an appropriate thickness. Like the motor-side output ring 32a, the chuck-side output ring 32b has a shaft insertion hole 32d, at the center thereof, having substantially the same shape as that of the cross section of the oblong connection section 3d, and central pin insertion through-holes 32e. A part around the shaft insertion hole 32d having an appropriate width is projected toward the chuck 4, namely, is formed to be thicker than the remaining part of the output ring 32b.

The chuck-side output ring 32b has right and left symmetrical side pin insertion through-holes 32g on the right and on the left of each central pin insertion through-hole 32e. The distance between each side pin insertion through-hole 32g and the central pin insertion through-hole 32e is substantially the same as the distance between the stoppage pin 34g and each stoppage projection 34h. Each side pin insertion through-hole 32g has a shape deformed from the central pin insertion through-hole 32e as follows. The side pin insertion through-hole 32g is formed of three continuous circles and thus has arcs projecting in three directions, but one of the two bottom circles, among the three circles forming the central pin insertion through-hole 32e, is lower than the other bottom circle. The higher bottom circle of the side pin insertion through-hole 32g is located closer to the vertical central line of the chuck-side output ring 32b.

The chuck-side output ring 32b has insertion holes 32f engageable with the insertion claws 32c and opposed to each other with the center of the chuck-side output ring 32b interposed therebetween. The phantom straight line connecting the insertion holes 32f perpendicularly crosses the phantom straight line connecting the two central pin insertion through-holes 32e. The pin insertion holes 31c, the central pin insertion through-holes 32e, and the pin insertion through-holes 38e are located at the same distance from the radial center of the lock mechanism 10A.

Owing to the above-described structure, as shown in FIG. 6, the upper and lower symmetrical float gears 34 are engaged with the lock ring 33, such that the teeth 34b are engaged with the inner teeth 33a of the lock ring 33 and the coil springs 35 in a compressed state are loosely engaged with the right and left spring attachment portions 34f. In this state, the legs 36b are inserted into the insertion recesses 33d, thereby attaching the legged O-ring 36 into the lock ring 33. The stoppage pins 34g projecting toward chuck 4 are inserted into the central pin insertion through-holes 32e of the chuck-side output ring 32b. The stoppage projections 34h are respectively inserted into the side pin insertion through-holes 32g. The engagement claws 32c inserted through the rectangular through-holes 37d are engaged with the engagement holes 32f, such that the motor-side output ring 32a and the chuck-side output ring 32b hold the delay plate 37, the legged O-ring 36, the lock ring 33 and the float gear 34 therebetween. Thus, the rear surface of the legged O-ring 36 interposed between the delay plate 37 and the lock ring 33 is contactable and thus slidable with the stoppage groove 37a having the arc-shaped cross section.

Then, the output rings 32, the lock ring 33 and the like which are assembled together as described above are positioned coaxially with the click spring 38 and the output gear 31, and the shaft fixing section 3e of the spindle 3 is inserted from the shaft insertion hole 32d of the chuck-side output ring 32b up to the position where the shaft insertion hole 32d of the chuck-side output ring 32b substantially contacts the end surface of the oblong connection section 3d bordering the shaft fixing section 3c of the spindle 3. In this manner, the lock mechanism 10A is assembled as shown in FIG. 6.

Next, the locking function of the lock mechanism 10A having the above-described structure will be described with reference to FIG. 6 through FIG. 10. FIG. 6 is a front view of the lock ring 33, the float gears 34, the motor-side output ring 32a, and the output gear 31 in a lock state. FIG. 7 is a front view of the output gear 31, the click spring 38, and the delay plate 37 in the same state. FIG. 8 is a front view of the lock ring 33, the float gears 34, the motor-side output ring 32a, and the output gear 31 in a release state where the output gear 31 is rotated in the direction of arrow r1 by the driving force of the motor M. FIG. 9 is a front view of the output gear 31, the click spring 38, and the delay plate 37 in the same state. FIG. 10 is a front view of the output gear 31, the click spring 38, and the delay plate 37 in a release state where the output gear 31 is rotated in the direction of arrow r3 by the driving force of the motor M.

Hereinafter, the operation in each state will be described with respect to the respective figures. First, as shown in FIG. 6 and FIG. 7, in the lock state when the motor M is at a stop, the upper and lower float gears 34 are pressed radially outward by an urging force of the coil springs 35 (not shown in FIG. 6 or FIG. 7). As a result, the inner teeth 33a are put into engagement with the teeth 34b. The stoppage pins 34g and the stoppage projections 34h are stopped at a locked position L, which is at a radially outward position of the pin insertion holes 31c, the central pin insertion through-holes 32e and the side pin insertion through-hole 32g. Therefore, the output rings 32 and the output gear 31 are nonrotatable with respect to the lock ring 33. As a result, the spindle 3 having the oblong connection section 3d inserted into the shaft insertion hole 32d with no play angle, together with the output rings 32, is nonrotatable with respect to the gear case 12 with which the lock ring 33 is fixedly engaged.

In this state, the rotation of the motor M (FIG. 1) is transmitted from the output shaft M1 (FIG. 2) to the output gear 31 (FIG. 2), and the shaft insertion hole 31b and the pin insertion holes 31c are rotated in the direction of arrow r1. However, due to the play angle α of the oblong connection section 3d and the engagement grooves 31d, the rotation of the shaft insertion hole 31b is not transmitted to the spindle 3 until the output gear 31 rotates by α degrees. As a result, the output gear 31 rotates with respect to the spindle 3, the output rings 32 and the like by the play angle α.

By the relative rotation of the output gear 31 in the direction of arrow r1, the stoppage pins 34g, which are pressed in the rotation direction by a post-rotation upper side surface AC1 of the pin insertion holes 31c, are guided radially inward along the post-rotation upper side surface AC1 and a post-rotation lower side surface AC2 to a released position R1.

The delay plate 37 slides along the legged O-ring 36 attached to the lock ring 33, and therefore restricts the rotation of the stoppage pins 34g pressed in the rotation direction by the post-rotation upper side surface AC1 of the pin insertion holes 31c. Thus, the float gears 34 can be guided, with certainty, radially inward along the post-rotation upper side surface and the post-rotation lower side surface AC2 to the released position R1.

In a consequence, as shown in FIG. 8, the float gears 34 move radially inward against the urging force of the coil springs 35, the teeth 34b and the inner gears 33a are disengaged from each other, and the lock mechanism 10A is automatically released from the lock state. Accordingly, the rotation of the output gear 31 is transmitted to the oblong connection section 3d by the post-rotation lower side surface AC2 of the shaft insertion hole 31b, and thus the spindle 3 can be rotated. The float gears 34, which have moved radially inward, are also rotated together with the output gear 31.

The stoppage pins 34g are engaged with the pin insertion through-holes 37c, and therefore the delay plate 37 rotates together with the float gears 34. However, since the delay plate 37 slides along the legged O-ring 36 attached to the lock ring 33, the delay plate 37 constantly exerts a force in the direction opposite to the rotation direction on the stoppage pins 34g. Therefore, the stoppage pins 34g can be held at the released position R1 with certainty while the lock mechanism 10A is rotating. Accordingly, even if an external force in the rotation direction or the opposite direction exerts on the spindle 3 during the rotation of the lock mechanism 10A, the spindle 3 can be held in the release state with certainty.

Since the lock mechanism 10A is automatically released from the lock state by the rotation driving force of the motor M, the rotation driving force of the motor M can be output from the spindle 3 easily and normally. Thus, the electric tool can be operated in a normal manner.

Owing to the loose engagement portions 34c of the float gears 34, the interference of the oblong connection section 3d and the float gears 34 can be prevented while the float gears 34 moves radially inward, which guarantees the automatic release operation.

As described above, in the state shown in FIG. 8 and FIG. 9, the rotation driving force of the motor M is transmitted and thus the spindle 3 is rotated. At this point, as shown in FIG. 9, a part of each hook 38c is stopped by a trailing angled portion c1, in the rotation direction r1, of the engagement groove 31d. Owing to such a state, the lock mechanism 10A is rotated while the spring arm 38a is pressed radially inward.

Accordingly, when the motor M stops rotating and the spindle 3 gets rid of the load, the click spring 38 is guided by a radially outward urging force of the spring arm 38a to the above-mentioned angled portion c1 and the arc-shaped side surface of the engagement groove 31d. Thus, the click spring 38 is rotated together with the spindle 3 in the direction of arrow r2 such that the hook 38c is accommodated in the engagement groove 31d.

The output rings 32 which are fixed to the spindle 3 are also rotated in the direction of arrow r2 by the rotation of the spindle 3, but the output gear 31 having the play angle α (FIG. 6) with the oblong connection section 3d is not rotated. Since the length of the arc-shaped surface of the engagement groove 31d and the length of the arc-shaped portion of the hook 38c are determined in accordance with the play angle α of the output gear 31, the output rings 32 and the output gear 31 are relatively rotated in the opposite direction to the direction for releasing the lock mechanism 10A from the lock state.

Therefore, the stoppage pins 34g at the released position R1 are pressed in the direction of arrow r2 by a post-rotation lower side surface AC3 of the central pin insertion through-holes 32e, and are also moved to the locked position L by the urging force of the coil springs 35. The lock mechanism 10A is placed into the lock state shown in FIG. 6 and FIG. 7.

When the output gear 31 is rotated in the direction of arrow r3 (FIG. 7) from the lock state shown in FIG. 6, the stoppage pins 34g are guided radially inward to a released position R2 (FIG. 7) by the pin insertion holes 31c in substantially the same manner as described above, and the lock mechanism 10A is released from the lock state. In the state shown in FIG. 10, the rotation driving force of the motor M is transmitted and the spindle 3 is rotated. At this point, as shown in FIG. 10, a part of each hooks 38c is stopped by a trailing angled portion c2, in the rotation direction (arrow r3), of the engagement groove 31d. Owing to such a state, the lock mechanism 10A is rotated while the spring arm 38a is pressed radially inward.

Accordingly, when the motor M stops rotating and the spindle 3 gets rid of the load, the click spring 38 is guided by a radially outward urging force of the spring arm 38a to the above-mentioned angled portion c2 and the arc-shaped side surface of the engagement groove 31d. Thus, the click spring 38 is rotated together with the spindle 3 in the direction of arrow r4 such that the hook 38c is accommodated in the engagement groove 31d. The output rings 32 which are fixed to the spindle 3 are also rotated in the direction of arrow r4 by the rotation of the spindle 3. The stoppage pins 34g at the released position R2 are moved to the locked position L (FIG. 7) by the urging force of the central pin insertion through-holes 32e and the coil springs 35. The lock mechanism 10A is placed into the lock state shown in FIG. 6 and FIG. 7.

As described above with reference to FIG. 9 and FIG. 10, in accordance with whether the output gear 31 is rotated in the direction of arrow r1 or r2, the hook 38c contacts a different position, i.e., the angled portion c1 or c2 of the engagement groove 31d. Therefore, the part from the center of the arc-shaped surface of the engagement groove 31d to the angled portion c2 is formed to have a larger radius than the part from the center of the arc-shaped surface of the engagement groove 31d to the angled portion c1.

Owing to such a structure, regardless of whether the output gear 31 is rotated in the direction of arrow r1 or r2, the hook 38 is prevented from being completely deviated from the engagement groove 31d. Therefore, by relatively rotating the spindle 3 in the direction in which the output gear 31 has been rotated by a radially outward urging force of the spring arm 38a when the motor M stops rotating and the spindle 3 gets rid of the load, the stoppage pins 34g can be moved to the locked position L and the locking function of the lock mechanism 10A is provided with certainty.

As described above, by automatically locking the output rings 32, the spindle 3 is locked. In a consequence, the detachment of the chuck 4 (FIG. 1) and the manual operations of the electric tool can be performed easily. The loose engagement portions 34c are formed with a play angle with respect to the oblong connection section 3d. Owing to such a structure, even if the spindle 3 is rotated by the relative rotation of the output rings 32 and the like, the float gears 34 are prevented from interfering with the relative rotation of the spindle 3.

Next, the functions and effects of the rotation output device 10 including the lock mechanism 10A having the above structure will be described. As described above, the rotation output device 10 in this embodiment includes the output gear 31 for inputting a rotation driving force; the spindle 3 located coaxially with the output gear 31 for receiving the driving force from the output gear with the predetermined play angle α and outputting a rotation force; the lock ring 33 provided around an outer circumferential surface of the spindle 3 and is restricted from rotating; the output rings 32 fixed to the spindle 3 for rotating integrally with the spindle 3; the click spring 38 fixed to the spindle 3 for rotating the output rings 32 with respect to the output gear 31; the float gears 34 which are held by the output ring 32 to be urged radially outward, and fixedly engageable with the lock ring 33; the central pin insertion through-holes 32e and the side pin insertion through-holes 32g provided in the output rings 32 for releasing the float gears 34 radially outward and fixedly engaging the float gears 34 with the lock ring 33; and pin insertion holes 31c provided in the output gear 31 for guiding the float gears 34 radially inward and releasing the float gears 34 from the fixed engagement with the lock ring 33 by the rotation of the motor M. The click spring 38 relatively rotates the output rings 32 by the stoppage of the rotation driving of the output gear 31.

According to the above-described structure, the click spring 38 rotates the output rings 32 with respect to the output gear 31 by the stoppage of the rotation driving of the output gear 31. Therefore, the central pin insertion through-holes 32e provided in the output rings 32 release the float gears 34 radially outward and fixedly engage the float gears 34 with the lock ring 33. Thus, the lock mechanism 10A can be automatically placed into a lock state.

By the rotation of the output gear 31, the pin insertion holes 31c provided in the output gear 31 guide the float gears 34 radially inward and release the float gears 34 from the fixed engagement with the lock ring 33. Thus, the lock mechanism 10A can be automatically released from the lock state.

When the rotation driving of the output gear 31 is stopped, the click spring 38 rotates the output rings 32 with respect to the output gear 31 in the direction in which the output gear 31 has been rotated. Therefore, the change in the relative positions of the pin insertion holes 31c and the central pin insertion through-holes 32e by the relative rotation of the output gear 31 for releasing the lock mechanism 10A from the lock state can be reduced. As a result, the float gears 34 can be released radially outward and fixedly engaged with the lock ring 33 with certainty, and thus the lock mechanism 10A can be placed into a lock state.

The click spring 38 rotates the output rings 32 with respect to the output gear 31 by an angle corresponding to the play angle α. Therefore, the change in the relative positions of the pin insertion holes 31c and the central pin insertion through-holes 32e by the relative rotation of the output gear 31 for releasing the lock mechanism 10A from the lock state can be eliminated. As a result, the float gears 34 can be released radially outward and fixedly engaged with the lock ring 33 with further certainty, and thus the lock mechanism 10A can be placed into a lock state. Since the float gears 34 can be engaged with the lock ring 33 without loosely engaging the float gears 34 with the pin insertion holes 31 or the central pin insertion through-holes 32e, a lock mechanism with no play can be provided.

Two sets of the engagement groove 31d and the hook 38c are provided so as to be opposed to each other with the center interposed therebetween. As compared to a structure having one set of the engagement groove 31d and the hook 38c, the force for rotating the output rings 32 with respect to the output gear 31 can be increased. Thus, the output rings 32 can be rotated with respect to the output gear 31 with certainty.

The engagement grooves 31d and the hooks 38c are formed so as to have substantially the same arc-shape. Therefore, the rotation of the output rings 32 with respect to the output gear 31 can be smoothly caused by the arc-shape of the engagement grooves 31d and the hooks 38c. Thus, the output rings 32 can be rotated with respect to the output gear 31 with further certainty.

The hooks 38c are engageable with the arc-shaped engagement grooves 31d by an elastic force. Therefore, as compared to, for example, a structure in which the hooks 38c are engaged with the engagement grooves 31d by a driving force from a separate driving source, the number of parts and components can be reduced and the assembly thereof is easier. In the case where the hooks 38c are engageable with the arc-shaped engagement grooves 31d by an elastic force, the structure of the rotation output device 10, especially the structure of the lock mechanism 10, is relatively simple. Therefore, the possibility of the reliability, durability or the like of the lock mechanism 10 itself being deteriorated can be lowered.

The loose engagement portions 34c are formed between the float gears 34 and the spindle 3. Therefore, when the position of the float gears 34 in the rotation direction is maintained by the delay plate 37, the rotation of the spindle 3 is not transmitted to the float gears 34.

Therefore, the float gears 34 can be certainly prevented from rotating by an angle corresponding to the "loose engagement portions 34c" together with the spindle 3, and thus the float gears 34 can be certainly prevented from rotating together with the spindle 3. Accordingly, even when the output gear 31 and the spindle 3 are rotated together with no play angle α, the float gears 34 are not rotated. As a result, the relative positions of the float gears 34 and the output gear 31 change with certainty, which provides the lock function.

The central pin insertion through-holes 32e and/or the side pin insertion through-holes 32g are formed in the output rings 32, and the stoppage pins 34g and/or the stoppage projections 34h engageable with the central pin insertion through-holes 32e and/or the side pin insertion through-holes 32g are formed in the float gears 34. Therefore, the stoppage pins 34g and/or the stoppage projections 34h of the float gears 34 are engaged with the central pin insertion through-holes 32e and/or the side pin insertion through-holes 32g of the output rings 32. Thus, the lock mechanism 10A performs the locking operation.

Therefore, the output rings 32 and the float gears 34 are engaged with each other at a plurality positions, which improves the rigidity at the plurality of positions and thus improves the lock torque in the lock state. As a result, the lock torque by the float gears 34 in the lock state is improved, which provides a more certain and stable lock function.

The thickness of the parts of the output rings 32 around the shaft insertion holes 32d is made greater than the remaining parts of the output rings 32. Therefore, the area of the output rings 32 which receives the pressure from the spindle 3 can be enlarged.

Accordingly, the output rings 32 can receive the rotation torque from the spindle 3 with certainty while the output rings 32 are made thinner. Thus, the output rings 32 can receive the rotation torque from the spindle 3 with certainty and thus the lock torque can be improved, while the output rings 32 are formed to be compact.

The delay plate 37 for restricting the positional change of the float gears 34 is interposed between the float gears 34 and the lock ring 33, and the delay plate 37 is rotated integrally with the float gears 34 such that the outer end of the delay plate 37 contacts the lock ring 33. Therefore, the delay plate 37 does not slide along the float gears 34 while being in contact therewith. This prevents the delay plate 37 from adversely influencing the locking or releasing operation of the float gears 34.

Thus, even though the delay plate 37 is provided, the locking function of the float gears 34 can be stably provided with no undesirable possibility of being inhibited. The positional change of the float gears 34 is restricted by the delay plate 37. Therefore, the float gears 34, which are in the release state, are prevented from being placed into the lock state by an external force other than the rotation driving force of the output gear 31.

The legged O-ring 36 for increasing a sliding resistance is provided at the position where the delay plate 37 contacts the lock ring 33. As a result, the delay plate 37 contacts the lock ring 33 with a higher sliding resistance. This makes the delay plate 37 more easily influenced by the restriction on the rotation of the lock ring 33. As a result, the position of the delay plate 37 in the rotation direction is maintained with certainty, and the position of the float gears 34 in the rotation direction is maintained certainly by the delay plate 37.

The legged O-ring 36 is formed of an elastic rubber or resin material. This allows the delay plate 37 and the lock ring 33 to contact each other constantly. Namely, since the relative positional offset between the delay plate 37 and the lock ring 33 is absorbed by the legged O-ring 36, the delay plate 37 and the lock ring 33 can be in contact with each other constantly. Therefore, the position of the float gears 34 in the rotation direction is maintained constantly and certainly by the delay plate 37.

Two float gears 34 are provided in the circumference direction and set to rotate integrally with the delay plate 37. Owing to this structure, the lock torque can be increased.

Since the two float gears 34 are set to be rotated integrally with each other by one delay plate 37, the two float gears 34 are provided with a completely equal force of maintaining the position thereof in the rotation direction. Accordingly, the positions of the float gears 34 in the rotation direction are not separately maintained. Even in the case where two float gears 34 are provided, the positions thereof in the rotation direction can be constantly maintained in synchronization with each other.

The rotation output device 10 according to the present invention can be provided in any device requiring a rotation output, as well as an output system of an electric tool. Thus, the present invention significantly facilitates the operation of locking an electric tool or the like.

In this embodiment, the rotation output device 10 is provided in the output system of the electric tool. The rotation output device 10 according to the present invention is usable in any device requiring a rotation output.

In this embodiment, the output gear 31 has the engagement grooves 31d and the click spring 38 has hooks 38c. Alternatively, the click spring 38 may have the engagement grooves 31d and the output gear 31 may have the hooks 38c. In this embodiment, the click spring 38 is provided between the output gear 31 as an input element and the spindle 3 as an output element. Alternatively, the click spring 38 may be provided between the lock ring 33 which is a fixing element and the spindle 3 as an output element.

The elements of the present invention and the elements in the above-described embodiment correspond as follows.

The rotation input body of the present invention corresponds to the output gear 31;

the rotation output body corresponds to the spindle 3;

the release operation groove corresponds to the pin insertion holes 31c;

the arc-shaped groove corresponds to the engagement grooves 31d;

the guide holding plate corresponds to the output rings 32;

the fixing part corresponds to the shaft insertion hole 32d;

the lock operation groove corresponds to the central pin insertion through-holes 32e and the side pin insertion through-holes 32g;

the fixing member corresponds to the lock ring 33;

the engagement hole corresponds to the insertion recesses 33d;

the movement locking plate corresponds to the float gears 34;

the escaping portion corresponds to the loosely engagement portions 34c;

the engagement projection corresponds to the stoppage pins 34g and the stoppage projections 34h;

the sliding resistance increasing means corresponds to the legged O-ring 36;

the restriction plate corresponds to the delay plate 37; and the arc-shaped claw corresponds to the hooks 38c.

However, the present invention is not limited to the above-described embodiment.

The invention claimed is:
1. A rotation output device, comprising:
a rotation input body configured to input a rotation driving force and having an arc-shaped groove;
a rotation output body located coaxially with the rotation input body and configured to receive a driving force from the rotation input body with a predetermined play angle and to output a rotation force;
a fixing member provided around an outer circumferential surface of the rotation output body and restricted from rotating;
a guide holding plate fixed to the rotation output body and configured to rotate integrally with the rotation output body;
a relative rotation means fixed to the rotation output body and configured to rotate the guide holding plate with respect to the rotation input body, wherein the relative rotation means includes an elastic spring arm with a hook protruding radially outward and being engageable with the arc-shaped groove, wherein the hook
engages the arc-shaped groove when the rotating input body ceases rotation, and
remains flexed inward and disengaged from the arc-shaped groove while the rotating input body inputs a driving force;
a movement locking plate that is held by the guide holding plate, wherein the movement locking plate is configured to be urged radially outward and to fixedly engage the fixing member;
a lock operation groove provided in the guide holding plate and configured to release the movement locking plate radially outward to fixedly engage the movement locking plate with the fixing member; and
a release operation groove provided in the rotation input body and configured to guide the movement locking plate radially inward and to release the movement locking plate from the fixed engagement with the fixing member by the rotation of the rotation input body;
wherein the relative rotation means is configured to relatively rotate the guide holding plate upon stoppage of the rotation driving of the rotation input body.

2. The rotation output device according to claim 1, further comprising an escaping portion between the movement locking plate and the rotation output body.

3. The rotation output device according to claim 1, wherein:
the guide holding plate has a plurality of lock operation grooves; and
the movement locking plate has a plurality of engagement projections configured to be engaged with the lock operation grooves.

4. The rotation output device according to claim 1, wherein the guide holding plate comprises a fixing part that is thicker than the remaining part of the guide holding plate, and wherein the fixing part is configured to fix the guide holding plate to the rotation output body.

5. An electric tool comprising a rotation output device according to claim 1.

6. The rotation output device according to claim 1, wherein the lock operation groove has a triangular shape.

7. The rotation output device according to claim 1,
further comprising a restriction plate configured to restrict a positional change of the movement locking plate, the restriction plate being provided between the movement locking plate and the fixing member;
the restriction plate further configured to integrally rotate with the movement locking plate such that an outer end of the restriction plate contacts the fixing member.

8. The rotation output device according to claim 7, further comprising sliding resistance increasing means for increasing a sliding resistance, the sliding resistance increasing means being provided at a position where the restriction plate contacts the fixing member.

9. The rotation output device according to claim 7, further comprising a plurality of movement locking plates in a circumferential direction, wherein the plurality of movement locking plates are configured to be integrally rotated by the restriction plate.

10. The rotation output device according to claim 1, wherein the relative rotation means is configured to rotate the guide holding plate with respect to the rotation input body in a direction in which the rotation input body was last rotated after the rotation input body stops rotating.

11. The rotation output device according to claim 10, wherein the relative rotation means includes a a second elastic spring arm with a second hook protruding radially outward and being engageable with a second arc-shaped groove of the rotation input body.

12. The rotation output device according to claim 11, wherein the second hook engages the second arc-shaped groove when the rotating input body ceases rotation, and the second hook remains flexed inward and disengaged from the second arc-shaped groove while the rotating input body inputs a driving force.

13. The rotation output device according to claim 10, wherein the relative rotation means rotates the guide holding plate with respect to the rotation input body by an angle corresponding to the play angle.

14. A rotation output device, comprising:
a rotation input body configured to input a rotation driving force;
a rotation output body located coaxially with the rotation input body and configured to receive a driving force from the rotation input body with a predetermined play angle and to output a rotation force;
a fixing member provided around an outer circumferential surface of the rotation output body and restricted from rotating;
a guide holding plate fixed to the rotation output body and configured to rotate integrally with the rotation output body;
a click spring comprising a first elastic spring arm, a second elastic spring arm, and a central plate, wherein the click spring is fixed to the rotation output body and configured to rotate the guide holding plate with respect to the rotation input body;
a movement locking plate that is held by the guide holding plate, wherein the movement locking plate is configured to be urged radially outward and to fixedly engage the fixing member;
a lock operation groove provided in the guide holding plate and configured to release the movement locking plate radially outward to fixedly engage the movement locking plate with the fixing member, wherein the lock operation groove has a triangular shape;
a release operation groove provided in the rotation input body and configured to guide the movement locking plate radially inward and to release the movement locking plate from the fixed engagement with the fixing member by the rotation of the rotation input body; and
a relative rotation means configured to relatively rotate the guide holding plate upon stoppage of the rotation driving of the rotation input body.

15. A rotation output device, comprising:
a rotation input body comprising a circular recessed portion and engagement grooves on a circumferential surface of the circular recessed portion, wherein the rotation input body is configured to input a rotation driving force;
a rotation output body located coaxially with the rotation input body and configured to receive a driving force from the rotation input body with a predetermined play angle and to output a rotation force;
a fixing member provided around an outer circumferential surface of the rotation output body and restricted from rotating;
a spring plate provided in the circular recessed portion of the rotation input body and comprising a first and a second elastic spring arm, wherein the first and second elastic spring arms are configured to engage the engagement grooves and to rotate the spring plate with respect to the rotation input body upon stoppage of the rotation input body, wherein the first and second spring arms engage the engagement grooves when the rotation input body ceases rotation, and
remain flexed inward and disengaged from the engagement grooves while the rotation input body inputs a driving force;
a movement locking plate provided within an inner circumferential surface of the fixing member and comprising a plurality of teeth and a coil spring;
wherein the coil spring is configured to expand the movement locking plate radially outward and fixedly engage the plurality of teeth to the fixing member upon rotation of the spring plate when the rotation input body stops rotating; and
wherein the plurality of teeth are configured to disengage the fixing member when the rotation input body rotates.

* * * * *